US009509607B2

(12) United States Patent
Zhang et al.

(10) Patent No.: US 9,509,607 B2
(45) Date of Patent: Nov. 29, 2016

(54) METHOD, NETWORK DEVICE AND SYSTEM FOR SENDING AND RECEIVING PACKET

(71) Applicant: Huawei Technologies Co., Ltd., Shenzhen (CN)

(72) Inventors: Xudong Zhang, Beijing (CN); Wenxia Hou, Beijing (CN); Wei Zeng, Beijing (CN); Yuefeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 14/626,601

(22) Filed: Feb. 19, 2015

(65) Prior Publication Data
US 2015/0163135 A1 Jun. 11, 2015

Related U.S. Application Data

(63) Continuation of application No. PCT/CN2013/071184, filed on Jan. 31, 2013.

(30) Foreign Application Priority Data

Aug. 30, 2012 (CN) .......................... 2012 1 0315442

(51) Int. Cl.
*H04L 12/28* (2006.01)
*H04L 12/741* (2013.01)
(Continued)

(52) U.S. Cl.
CPC ............... *H04L 45/74* (2013.01); *H04L 45/66* (2013.01); *H04L 47/34* (2013.01); *H04L 45/026* (2013.01)

(58) Field of Classification Search
CPC ....... H04L 45/74; H04L 45/66; H04L 47/34; H04L 45/026
See application file for complete search history.

(56) References Cited

U.S. PATENT DOCUMENTS

| 5,574,860 | A | * | 11/1996 | Perlman | .................. | H04L 45/02 340/5.74 |
| 6,956,867 | B1 | * | 10/2005 | Suga | .................. | H04L 29/06027 370/465 |
| 2005/0018667 | A1 | * | 1/2005 | Chandra | .................. | H04L 45/02 370/389 |

FOREIGN PATENT DOCUMENTS

| CN | 102075438 A | 5/2011 |
| CN | 102185782 A | 9/2011 |

(Continued)

OTHER PUBLICATIONS

Information Technology-Telecommunications and Information Exchange Between Systems—Intermediate System to Intermediate System Intra-Domain Routeing Infromation Exchange Protocol for Use in Conjunction with the Protocol for Providing the Connection-less-Mode Network Service (ISO 8473), International Standard, ISO/IEC 10589, Nov. 15, 2002, 10 pages.

(Continued)

*Primary Examiner* — Clemence Han
(74) *Attorney, Agent, or Firm* — Slater Matsil, LLP (57) ABSTRACT

Embodiments of the present invention provide a method, network device, and system for sending and receiving a packet. The method includes fragmenting, by a first network device, a first Hello packet. Each Hello fragment packet has a fragment ID and a content identifier. The first network device sends fragment brief information of the first Hello packet to a second network device. The fragment brief information of the first Hello packet includes fragment information of each Hello fragment packet. The first network device sends the Hello fragment packet corresponding to the first Hello packet if the first network device receives a request packet sent by the second network device.

18 Claims, 5 Drawing Sheets

(51) Int. Cl.
*H04L 12/801* (2013.01)
*H04L 12/721* (2013.01)
*H04L 12/751* (2013.01)

(56) References Cited

FOREIGN PATENT DOCUMENTS

| | | |
|---|---|---|
| CN | 102307144 A | 1/2012 |
| CN | 102394819 A | 3/2012 |
| CN | 102546409 A | 7/2012 |
| EP | 2677704 A1 | 12/2013 |

OTHER PUBLICATIONS

Perlman, R., "Routing Bridges (RBridges): Base Protocol Specification", Internet Engineering Task Force (IETF), Category: Standards Track, ISSN: 2070-1721, Jul. 2011, 99 pages.

Eastlake, D., et al., "Routing Bridges (RBridges): Adjacency," Internet Engineering Task Force (IETF), Request for Comments: 6327, Updates: 6325, Category: Standards Track, ISSN: 2070-1721, Jul. 2011, 26 pages.

Eastlake, D., et al., "TRILL: Clarifications, Corrections, and Updates," TRILL Working Group, Internet-Draft, Intended Status: Proposed Standard, Updates: 6325, 6327, 6439, Jan. 27, 2012, 28 pages.

Hiertz, G.R., et al., "Mesh Networks Alliance (MNA); Proposal; IEEE 802.11s—MAC Sublayer Functional Description; IEEE 80211s—Mesh WLAN Security," IEEE P802.11, Wireless LANs, Jun. 2005, 46 pages.

Perlman, R., et al., "RBridges: Base Protocol Specification," TRILL Working Group, Internet-Draft, Intended Status: Proposed Standard, Mar. 3, 2010, 118 pages.

\* cited by examiner

```
┌─────────────────────────────────────────────────────────────┐
│ A first network device fragments a first Hello packet into m Hello fragment │
│ packets in a preset packet fragmentation manner, where each Hello fragment │
│ packet has a fragment ID and a content identifier, where when content of an │
│ $n^{th}$ Hello fragment packet corresponding to the first Hello packet is different │
│ from content of an $n^{th}$ Hello fragment packet corresponding to a second Hello │
│ packet, a content identifier of the $n^{th}$ Hello fragment packet corresponding to │
│ the first Hello packet is set to be different from a content identifier of the $n^{th}$ │── 102
│ Hello fragment packet corresponding to the second Hello packet (n is a │
│ fragment ID of the $n^{th}$ Hello fragment packet; n can be all positive integers │
│ ranging from 1 to m; and m is a positive integer); the second Hello packet is a │
│ Hello packet sent by the first network device at a last time before sending the │
│ first Hello packet; and the first network device has already fragmented the │
│ second Hello packet into p Hello fragment packets in the preset packet │
│ fragmentation manner (p is a positive integer) │
└─────────────────────────────────────────────────────────────┘
                                │
┌─────────────────────────────────────────────────────────────┐
│ The first network device sends fragment brief information of the first Hello │
│ packet to a second network device, where the fragment brief information of │── 104
│ the first Hello packet includes fragment information of each Hello fragment │
│ packet of the m Hello fragment packets, and the fragment information │
│ includes the fragment ID and the content identifier │
└─────────────────────────────────────────────────────────────┘
                                │
┌─────────────────────────────────────────────────────────────┐
│ The first network device sends a Hello fragment packet corresponding to the │
│ first Hello packet to the second network device if the first network device │
│ receives a request packet sent by the second network device, where the request │
│ packet is sent after the second network device receives the fragment brief │
│ information of the first Hello packet and determines that the fragment brief │── 106
│ information of the first Hello packet is different from fragment brief │
│ information of the second Hello packet saved on the second network device, │
│ and the fragment brief information of the second Hello packet includes the │
│ fragment information of each Hello fragment packet of the p Hello fragment │
│ packets │
└─────────────────────────────────────────────────────────────┘
```

FIG. 1

```
+-+-+-+-+-
|      Type           | (1 byte)
+-+-+-+-+-
|     Length          | (1 byte)
+-+-+-+-+-+-+-+-+-
|   Hello fragment brief info (1)    |
+-+-+-+-+-+-+-+-+-
|          ......                    |
+-+-+-+-+-+-+-+-+-
|   Hello fragment brief info (N)    |
+-+-+-+-+-+-+-+-+-

Hello fragment brief info:
+-+-+-+-+-
|   Fragment ID       | (1 byte)
+-+-+-+-+-
|     Length          | (2 bytes)
+-+-+-+-+-
| Sequence number     | (2 bytes)
+-+-+-+-+-
```

FIG. 2

```
+-+-+-+-+-
|      Type           | (1 byte)
+-+-+-+-+-
|     Length          | (1 byte)
+-+-+-+-+-
```

FIG. 3

```
+-+-+-+-+-+-
|      Type       |  (1 byte)
+-+-+-+-+-+-
|     Length      |  (1 byte)
+-+-+-+-+-+-
|   Fragment ID   |  (1 byte)
+-+-+-+-+-+-
```

FIG. 4

A second network device receives fragment brief information of a first Hello packet sent by a first network device, where the fragment brief information of the first Hello packet includes fragment information of each Hello fragment packet of the first Hello packet, and the fragment information includes a fragment ID and a content identifier; the first network device fragments the first Hello packet into m Hello fragment packets in a preset packet fragmentation manner, where when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment corresponding to the second Hello packet (n is a fragment ID of the $n^{th}$ Hello fragment packet; n can be all positive integers ranging from 1 to m; and m is a positive integer); the second Hello packet is a Hello packet sent by the first network device at a last time before sending the first Hello packet; and the first network device has already fragmented the second Hello packet into p Hello fragment packets in the preset packet fragmentation manner (p is a positive integer) ⟵ 502

Send a request message to the first network device when the second device determines that the fragment brief information of the first Hello packet is different from saved fragment brief information of the second Hello packet, where the request message is used to request to obtain a Hello fragment packet corresponding to the first Hello packet, and the fragment brief information of the second Hello packet includes fragment information of each Hello fragment packet of the p Hello fragment packets ⟵ 504

Receive the Hello fragment packet that is corresponding to the first Hello packet and is sent by the first network device ⟵ 506

METHOD, NETWORK DEVICE AND SYSTEM FOR SENDING AND RECEIVING PACKET

This application is a continuation of International Application No. PCT/CN2013/071184, filed on Jan. 31, 2013, which claims priority to Chinese Patent Application No. 201210315442.6, filed on Aug. 30, 2012, both of which are hereby incorporated by reference in their entireties.

TECHNICAL FIELD

The present invention relates to the field of communications technology, and in particular, to a method, network device, and system for sending and receiving a packet.

BACKGROUND

Transparent Interconnection of Lots of Links (TRILL) is a Layer 2 network standard recommended by the Internet Engineering Task Force (IETF) and is a type of routing protocol based on link state calculation on a Layer 2 network. On a TRILL network, each Router Bridge (RB) device interacts with other RB devices on the network by using a Hello (Hello) packet. Moreover, one RB is selected as a Designated Router Bridge (DRB), which is responsible for completing such functions as Appointed Forwarder (AF) and Designated Virtual Local Area Network (Designated VLAN) by sending the Hello packet. Like other routing protocols, the TRILL protocol also regularly performs neighbor discovery and maintains a neighbor relationship on a link by using the Hello packet.

With continuous expansion of TRILL applications on the TRILL network, the Hello packet may carry multiple pieces of Type, Length, and Value (TLV) information, such as enabled-VLANs sub-TLV information, appointed forwarders sub-TLV information, and TRILL neighbor TLV information. As the Hello packet carries an increasing amount of information, network bandwidth occupied to send the Hello packet on the TRILL network grows larger, and available bandwidth for other service packets becomes smaller, thereby severely affecting normal sending of service packets on the TRILL network.

SUMMARY

Embodiments of the present invention provide a method, network device, and system for sending and receiving a packet, to reduce network bandwidth occupied to send a Hello packet on a TRILL network, so as to avoid a problem that normal sending of service packets is severely affected on the TRILL network because the network bandwidth occupied to send the Hello packet grows larger while available bandwidth for other service packets becomes smaller.

According to a first aspect, a method for sending a Hello packet on a TRILL network is provided. A first network device fragments a first Hello packet into m Hello fragment packets in a preset packet fragmentation manner. Each Hello fragment packet has a fragment ID and a content identifier, where when content of an $n^{th}$ Hello fragment packet corresponding to the first Hello packet is different from content of the $n^{th}$ Hello fragment packet corresponding to a second Hello packet, a content identifier of an $n^{th}$ Hello fragment packet corresponding to the first Hello packet is set to be different from a content identifier of the $n^{th}$ Hello fragment packet corresponding to the second Hello packet, where n is a fragment ID of the $n^{th}$ Hello fragment packet, n can be all positive integers ranging from 1 to m, and m is a positive integer; the second Hello packet is a Hello packet sent by the first network device at the last time before sending the first Hello packet, and the first network device has already fragmented the second Hello packet into p Hello fragment packets in the preset packet fragmentation manner, where p is a positive integer. The first network device sends fragment brief information of the first Hello packet to a second network device. The fragment brief information of the first Hello packet includes fragment information of each Hello fragment packet of the m Hello fragment packets, and the fragment information includes the fragment ID and the content identifier. A Hello fragment packet corresponding is sent to the first Hello packet to the second network device if the first network device receives a request packet sent by the second network device. The request packet is sent after the second network device receives the fragment brief information of the first Hello packet and determines that the fragment brief information of the first Hello packet is different from fragment brief information of the second Hello packet saved on the second network device, and the fragment brief information of the second Hello packet includes fragment information of each Hello fragment packet of the p Hello fragment packets.

In a first possible implementation manner of the first aspect, the method further includes setting the content identifier of the $n^{th}$ Hello fragment packet corresponding to the first Hello packet to be the same as the content identifier of the $n^{th}$ Hello fragment packet corresponding to the second Hello packet when the content of the $n^{th}$ Hello fragment packet corresponding to the first Hello packet is the same as the content of the $n^{th}$ Hello fragment packet corresponding to the second Hello packet; and setting the content identifier of the $n^{th}$ Hello fragment packet of the m Hello fragment packets to an initial value when the $n^{th}$ Hello fragment packet exists in the m Hello fragment packets but the $n^{th}$ Hello fragment packet does not exist in the p Hello fragment packets.

With reference to the first aspect or in the first possible implementation manner of the first aspect, a second possible implementation manner of the first aspect is further provided, where the determining that the fragment brief information of the first Hello packet is different from fragment brief information of the second Hello packet saved on the second network device, includes confirming that the fragment brief information of the first Hello packet is different from the fragment brief information of the second Hello packet when it is determined that a data length of the fragment brief information of the first Hello packet is different from a data length of the fragment brief information of the second Hello packet; or confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, where a fragment ID of the first fragment information is the same as a fragment ID of the second fragment information, but a content identifier of the first fragment information is different from a content identifier of the second fragment information.

With reference to the first aspect or in any of the foregoing possible implementation manners of the first aspect, a third possible implementation manner of the first aspect is further provided, where the sending a Hello fragment packet corresponding to the first Hello packet to the second network device, includes sending each Hello fragment packet corresponding to the first Hello packet to the second network device.

In the first aspect or in any of the foregoing possible implementation manners of the first aspect, a fourth possible implementation manner of the first aspect is further provided, where the request packet includes a first fragment ID, and the first fragment ID meets the following conditions: a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, sending the Hello fragment packet corresponding to the first Hello packet to the second network device includes sending the Hello fragment packet that is corresponding to the first Hello packet and whose fragment ID is the first fragment ID to the second network device.

According to a second aspect, a method for receiving a Hello packet on a TRILL network is provided. A second network device receives fragment brief information of a first Hello packet sent by a first network device. The fragment brief information of the first Hello packet includes fragment information corresponding to each Hello fragment packet of the first Hello packet. The fragment information includes a fragment ID and a content identifier; the first network device has already fragmented the first Hello packet into m Hello fragment packets in a preset packet fragmentation manner. When content of an $n^{th}$ Hello fragment packet corresponding to the first Hello packet is different from content of an $n^{th}$ Hello fragment packet corresponding to a second Hello packet, the first network device has already set a content identifier of the $n^{th}$ Hello fragment packet corresponding to the first Hello packet to be different from a content identifier of the $n^{th}$ Hello fragment packet corresponding to the second Hello packet, where n is a fragment ID of the $n^{th}$ Hello fragment packet, n can be all positive integers ranging from 1 to m, and m is a positive integer. The second Hello packet is a Hello packet sent by the first network device at the last time before sending the first Hello packet, and the first network device has already fragmented the second Hello packet into p Hello fragment packets in the preset packet fragmentation manner, where p is a positive integer. A request message is sent to the first network device when the second network device determines that the fragment brief information of the first Hello packet is different from saved fragment brief information of the second Hello packet. The request message is used to request to obtain the Hello fragment packet corresponding to the first Hello packet, and the fragment brief information of the second Hello packet includes the fragment information of each Hello fragment packet of the p Hello fragment packets. The Hello fragment packet that is corresponding to the first Hello packet is received and is sent by the first network device.

With reference to the second aspect or in a first possible implementation manner of the first aspect, where the second network device determines that the fragment brief information of the first Hello packet is different from saved fragment brief information of the second Hello packet, includes confirming that the fragment brief information of the first Hello packet is different from the fragment brief information of the second Hello packet when it is determined that a data length of the fragment brief information of the first Hello packet is different from a data length of the fragment brief information of the second Hello packet; or confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, where a fragment ID of the first fragment information is the same as a fragment ID of the second fragment information, but a content identifier of the first fragment information is different from a content identifier of the second fragment information.

In the second aspect or in the first possible implementation manner of the second aspect, a second possible implementation manner of the second aspect is further provided, where the receiving the Hello fragment packet that is corresponding to the first Hello packet and is sent by the first network device, includes receiving each Hello fragment packet that is corresponding to the first Hello packet and is sent by the first network device.

With reference to the second aspect or in the first possible implementation manner of the second aspect, a third possible implementation manner of the second aspect is further provided, where the request packet includes a first fragment ID, and the first fragment ID meets the following conditions a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, receiving the Hello fragment packet that is corresponding to the first Hello packet and is sent by the first network device, includes receiving the Hello fragment packet that is corresponding to the first Hello packet and whose fragment ID is the first fragment ID.

According to a third aspect, a network device for sending a Hello packet on a TRILL network is provided. The network device includes a number of units. A fragmenting unit is configured to fragment a first Hello packet into m Hello fragment packets in a preset packet fragmentation manner. Each Hello fragment packet has a fragment ID and a content identifier. When content of an $n^{th}$ Hello fragment packet corresponding to the first Hello packet is different from content of the $n^{th}$ Hello fragment packet corresponding to a second Hello packet, a content identifier of an $n^{th}$ Hello fragment packet corresponding to the first Hello packet is set to be different from a content identifier of the $n^{th}$ Hello fragment packet corresponding to the second Hello packet, where n is a fragment ID of the $n^{th}$ Hello fragment packet, n can be all positive integers ranging from 1 to m, and m is a positive integer. The second Hello packet is a Hello packet sent by the network device at the last time before sending the first Hello packet, and the fragmenting unit has already fragmented the second Hello packet into p Hello fragment packets in the preset packet fragmentation manner, where p is a positive integer.

A first sending unit is configured send fragment brief information of the first Hello packet to a second network device. The fragment brief information of the first Hello packet includes fragment information of each Hello fragment packet of the m Hello fragment packets, and the fragment information includes the fragment ID and the content identifier a receiving unit is configured to receive a request packet sent by the second network device. The request packet is sent after the second network device receives the fragment brief information of the first Hello packet and determines that the fragment brief information of the first Hello packet is different from fragment brief information of the second Hello packet saved on the second network device. The fragment brief information of the second Hello packet includes fragment information of each Hello fragment packet of the p Hello fragment packets. A second sending unit is configured to send a Hello fragment packet corresponding to the first Hello packet to the second network device if the receiving unit receives the request packet.

With reference to a first possible implementation manner of the third aspect, the fragmenting unit is further configured to set the content identifier of the $n^{th}$ Hello fragment packet corresponding to the first Hello packet to be the same as the content identifier of the $n^{th}$ Hello fragment packet corresponding to the second Hello packet when the content of the $n^{th}$ Hello fragment packet corresponding to the first Hello packet is the same as the content of the $n^{th}$ Hello fragment packet corresponding to the second packet, and set the content identifier of the $n^{th}$ Hello fragment packet of the m Hello fragment packets to an initial value when the $n^{th}$ Hello fragment packet exists in the m Hello fragment packets but the $n^{th}$ Hello fragment packet does not exist in the p Hello fragment packets.

With reference to the third aspect or in the first possible implementation manner of the third aspect, a second possible implementation manner of the third aspect is further provided, where the sending, by the second sending unit, a Hello fragment packet corresponding to the first Hello packet to the second network device, includes sending each Hello fragment packet corresponding to the first Hello packet to the second network device.

With reference to the third aspect or in the first possible implementation manner of the third aspect, a third possible implementation manner of the third aspect is further provided, where the request packet includes a first fragment ID, and the first fragment ID meets the following conditions a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, the second sending unit sends the Hello fragment packet that is corresponding to the first Hello packet and whose fragment ID is the first fragment ID to the second network device.

According to a fourth aspect, a network device for receiving a Hello packet on a TRILL network is provided. The network device includes a number of units. A first receiving unit is configured to receive fragment brief information of a first Hello packet sent by a first network device. The fragment brief information of the first Hello packet includes fragment information corresponding to each Hello fragment packet of the first Hello packet. The fragment information includes a fragment ID and a content identifier; the first network device has already fragmented the first Hello packet into m Hello fragment packets in a preset packet fragmentation manner. When content of an $n^{th}$ Hello fragment packet corresponding to the first Hello packet is different from content of an $n^{th}$ Hello fragment packet corresponding to a second Hello packet, the first network device has already set a content identifier of the $n^{th}$ Hello fragment packet corresponding to the first Hello packet to be different from a content identifier of the $n^{th}$ Hello fragment packet corresponding to the second Hello packet, where n is the fragment ID of the $n^{th}$ Hello fragment packet, n can be all positive integers ranging from 1 to m, and m is a positive integer. The second Hello packet is a Hello packet sent by the first network device at the last time before sending the first Hello packet, and the first network device has already fragmented the second Hello packet into p Hello fragment packets in the preset packet fragmentation manner, where p is a positive integer.

A determining unit is configured to determine whether the fragment brief information of the first Hello packet received by the first receiving unit is the same as saved fragment brief information of the second Hello packet. A sending unit is configured to send a request message to the first network device when the determining unit determines that the fragment brief information of the first Hello packet received by the first receiving unit is different from the saved fragment brief information of the second Hello packet. The request message is used to request to obtain a Hello fragment packet corresponding to the first Hello packet, and the fragment brief information of the second Hello packet includes the fragment information of each Hello fragment packet of the p Hello fragment packets. A second receiving unit is configured to receive the Hello fragment packet that is corresponding to the first Hello packet and is sent by the first network device.

In a first possible implementation manner of the fourth aspect, where the receiving, by the second receiving unit, the Hello fragment packet that is corresponding to the first Hello packet and is sent by the first network device, includes receiving each Hello fragment packet that is corresponding to the first Hello packet and is sent by the first network device.

With reference to a second possible implementation manner of the fourth aspect, where the request packet includes a first fragment ID, and the first fragment ID meets the following conditions a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, the receiving unit receives the Hello fragment packet that is corresponding to the first Hello packet and whose fragment ID is the first fragment ID.

With reference to a fifth aspect, a system for sending and receiving a Hello packet on a TRILL network is provided, where the system includes a first network device and a second network device. The first network device includes a fragmenting unit, configured to fragment a first Hello packet into m Hello fragment packets in a preset packet fragmentation manner. Each Hello fragment packet has a fragment ID and a content identifier, where when content of an $n^{th}$ Hello fragment packet corresponding to the first Hello packet is different from content of the $n^{th}$ Hello fragment packet corresponding to a second Hello packet, a content identifier of an $n^{th}$ Hello fragment packet corresponding to the first Hello packet is set to be different from a content identifier of the $n^{th}$ Hello fragment packet corresponding to the second Hello packet, where n is a fragment ID of the $n^{th}$ Hello fragment packet, n can be all positive integers ranging from 1 to m, and m is a positive integer. The second Hello packet is a Hello packet sent by the network device at the last time before sending the first Hello packet, and the fragmenting unit has already fragmented the second Hello packet into p Hello fragment packets in the preset packet fragmentation manner, where p is a positive integer. A first sending unit is configured to send fragment brief information of the first Hello packet to the second network device. The fragment brief information of the first Hello packet includes fragment information of each Hello fragment packet of the m Hello fragment packets, and the fragment information includes the fragment ID and the content identifier. A receiving unit is configured to receive a request packet sent by the second network device. A second sending unit is configured to send a Hello fragment packet corresponding to the first Hello packet to the second network device if the receiving unit receives the request packet. The second network device includes a receiving unit, which is configured to receive the fragment brief information of the first Hello packet sent by the first sending unit. A determining unit is configured to determine whether the fragment brief information of the first Hello packet received by the first receiving unit is the same as saved fragment brief information of the second Hello packet. A sending unit is configured to send a request message to the first network device when the determining unit determines that the fragment brief information of the first Hello packet received by the first receiving unit is different from the saved fragment brief information of the second Hello packet. The request message is used to request to obtain a Hello fragment packet corresponding to the first Hello packet, and the fragment brief information of the second Hello packet includes the fragment information of each Hello fragment packet of the p Hello fragment packets. A second receiving unit is configured to receive the Hello fragment packet that is corresponding to the first Hello packet and is sent by the second sending unit.

According to the technical solutions provided by the embodiments of the present invention, after a first network device fragments a first Hello packet, the first network device sends fragment brief information of the first Hello packet to a second network device, where the fragment brief information of the first Hello packet includes a fragment ID and a content identifier of each Hello fragment packet. When the second network device determines that the fragment brief information of the first Hello packet is different from fragment brief information of a second Hello packet, the second network device sends a request message to the first network device to request for a Hello fragment packet that is not saved on the second network device; when the fragment brief information of the first Hello packet is the same as the fragment brief information of the second Hello packet, the first network device does not need to resend the fragment packet of the first Hello packet to the second network device, thereby reducing network bandwidth occupied to send the Hello packet. When the fragment information of only some of the Hello fragment packets in the fragment brief information of the first Hello packet is different from the fragment brief information of the second Hello packet, the first network device only needs to send the Hello fragment packet that is not saved on the second network device to the second network device, thereby also reducing the network bandwidth occupied to send the Hello packet.

BRIEF DESCRIPTION OF THE DRAWINGS

FIG. 1 is a schematic flowchart of a method for sending a Hello packet according to an embodiment of the present invention;

FIG. 5 is a flowchart of implementation of a method for receiving a Hello packet according to an embodiment of the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Referring to FIG. 1, an embodiment of the present invention provides a method for sending a Hello packet on a TRILL network. The method includes the following content.

102: A first network device fragments a first Hello packet into m Hello fragment packets in a preset packet fragmentation manner, where each Hello fragment packet has a fragment ID and a content identifier, where when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment packet corresponding to the second Hello packet (n is a fragment ID of the $n^{th}$ Hello fragment packet; n can be all positive integers ranging from 1 to m; and m is a positive integer); the second Hello packet is a Hello packet sent by the first network device at the last time before sending the first Hello packet; and the first network device has already fragmented the second Hello packet into p Hello fragment packets in the preset packet fragmentation manner (p is a positive integer).

The preset packet fragmentation manner includes a fragment ID allocation manner. According to the fragment ID allocation manner, different positive integers may be allocated according to a fragmentation sequence. For example, a fragment ID 1 is allocated to a first fragment packet, a fragment ID 2 is allocated to a second fragment packet, and so on. In this way, a different fragment ID is allocated to each fragment packet.

The content of the $n^{th}$ Hello fragment packet corresponding to the first Hello packet is different from the content of the $n^{th}$ Hello fragment packet corresponding to the second Hello packet. This specifically means that when packets have the same n value, their content is compared. For example, when n is 10, it means that content of the $10^{th}$ Hello fragment packet corresponding to the first Hello packet is different from content of the $10^{th}$ Hello fragment packet corresponding to the second Hello packet.

Optionally, the content identifier may be a character string representing certain meanings, or may be a natural number. For example, when the second Hello packet is the first Hello packet sent by the first network device to another device on the network, a content identifier of each Hello fragment packet of the second Hello packet may be set to an initial value 0; when the content identifier of the $n^{th}$ Hello fragment packet corresponding to the first Hello packet is different from the content identifier of the $n^{th}$ Hello fragment packet corresponding to the second Hello packet, the content identifier of the $n^{th}$ Hello fragment packet corresponding to the first Hello packet is set to 1. Optionally, a content identifier of a Hello packet corresponding to a certain fragment ID increases, within a specific range, in a sequence of natural numbers, and the content identifier is reallocated from 0 when a value of the content identifier exceeds the specific range.

Optionally, when the content of the $n^{th}$ Hello fragment packet corresponding to the first Hello packet is the same as the content of the $n^{th}$ Hello fragment packet corresponding to the second Hello packet, the content identifier of the $n^{th}$ Hello fragment packet corresponding to the first Hello packet is set to be the same as the content identifier of the $n^{th}$ Hello fragment packet corresponding to the second Hello packet.

When the $n^{th}$ Hello fragment packet exists in the m Hello fragment packets but the $n^{th}$ Hello fragment packet does not exist in the p Hello fragment packets, the content identifier of the $n^{th}$ Hello fragment packet of the m Hello fragment packets is set to an initial value, for example, a natural number 0.

104: The first network device sends fragment brief information of the first Hello packet to a second network device, where the fragment brief information of the first Hello packet includes fragment information of each Hello fragment packet of the m Hello fragment packets, and the fragment information includes the fragment ID and the content identifier.

Figure 2:
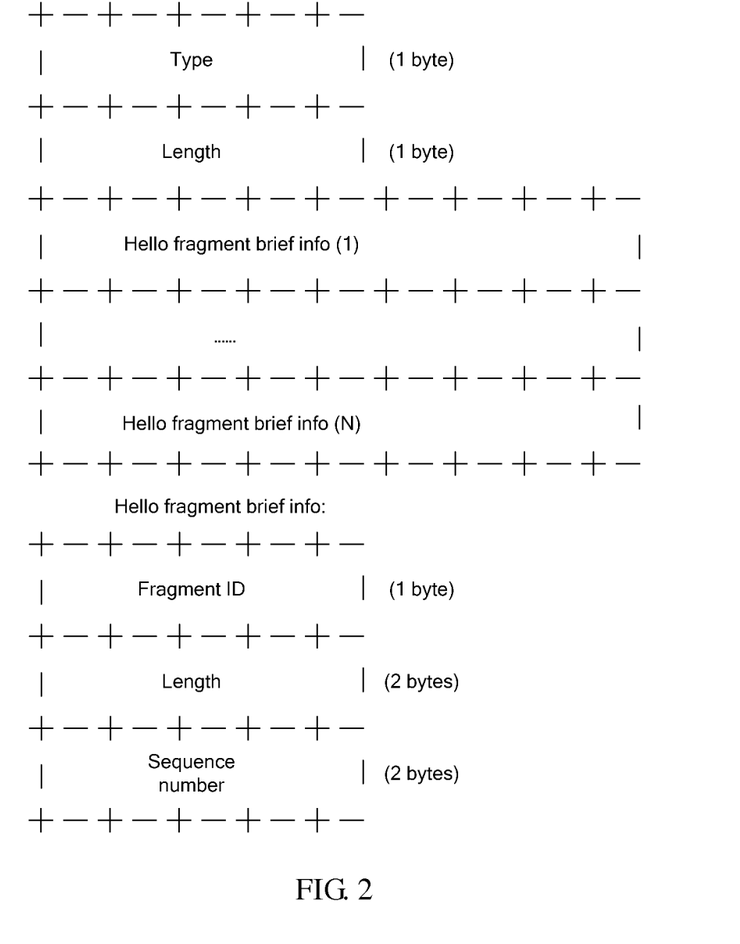
FIG. 2 is a schematic diagram of TLV of fragment brief information of a Hello packet according to an embodiment of the present invention.

The fragment brief information of the first Hello packet may be encapsulated in a fragment brief information TLV manner, where a fragment brief information TLV may be carried in a Hello packet on the TRILL network, and a format of the fragment brief information TLV is shown in FIG. 2, where:

Type (Type), used to identify that the Hello packet includes the fragment brief information TLV and its value is different from a type value of a TLV type in the prior-art Hello packet;

Length (Length), used to identify a data length of the fragment brief information TLV;

Hello fragment brief information (Hello Fragment Brief Info), used to identify the fragment information of each Hello fragment packet, where:

Fragment ID (Fragment ID), used to identify a fragment ID of a Hello fragment packet;

Length (Length), used to identify a data length of fragment brief information of the Hello packet;

Sequence number (Sequence number), used as a content identifier of the Hello fragment packet, where a value of the sequence number may be a natural number.

106: The first network device sends a Hello fragment packet corresponding to the first Hello packet to the second network device if the first network device receives a request packet sent by the second network device, where the request packet is sent after the second network device receives the fragment brief information of the first Hello packet and determines that the fragment brief information of the first Hello packet is different from fragment brief information of the second Hello packet saved on the second network device, and the fragment brief information of the second Hello packet includes the fragment information of each Hello fragment packet of the p Hello fragment packets.

Optionally, the determining that the fragment brief information of the first Hello packet is different from the fragment brief information of the second Hello packet saved on the second network device, includes confirming that the fragment brief information of the first Hello packet is different from the fragment brief information of the second Hello packet when it is determined that a data length of the fragment brief information of the first Hello packet is different from a data length of the fragment brief information of the second Hello packet; or confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, where a fragment ID of the first fragment information is the same as a fragment ID of the second fragment information, but a content identifier of the first fragment information is different from a content identifier of the second fragment information.

Optionally, when the first network device does not receive a request message, which indicates that the content of the second Hello packet saved on the second network device is the same as the content of the first Hello packet, the second network device does not need to request to obtain, from the first network device, the Hello fragment packet of the first Hello packet. This avoids a problem that network bandwidth is occupied by the first Hello packet sent by the first network device to the second network device even when the content of the second Hello packet saved on the second network device is the same as the content of the first Hello packet.

Optionally, the second network device only needs to determine that the fragment brief information of the first Hello packet is different from the fragment brief information of the second Hello packet, but does not need to determine which fragment information is different. The second network device sends the request message to the first network device. When the first network device receives the request message, it indicates that the content of the second Hello packet saved on the second network device is different from the content of the first Hello packet. The sending, by the first network device, a Hello fragment packet corresponding to the first Hello packet to the second network device, includes sending each Hello fragment packet corresponding to the first Hello packet to the second network device.

Figure 3:
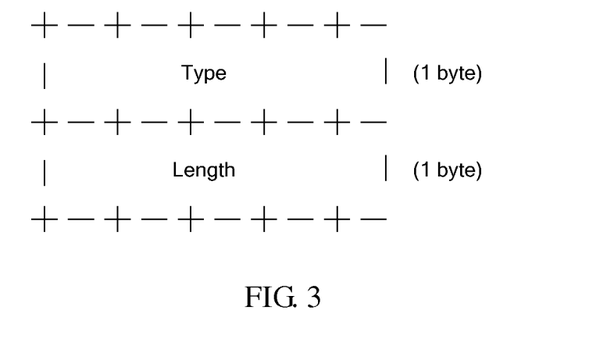
FIG. 3 is a schematic diagram of TLV of a request packet according to an embodiment of the present invention.

Optionally, a format of the request packet may be encapsulated in the TLV manner and may be carried in the Hello packet on the TRILL network. The format of the request packet is shown in FIG. 3, where:

Type (Type), used to identify that the Hello packet includes a request packet TLV and its value is different from the type value of the TLV type in the prior-art Hello packet and is different from the type value of the fragment brief information TLV provided by this embodiment of the present invention;

Length (Length), used to identify a data length of the request packet TLV.

Optionally, the request packet may further include a first fragment ID, and the first fragment ID meets the following conditions a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, when the first network device receives the request message that includes the first fragment ID, which indicates that the content of the second Hello packet saved on the second network device is different from the content of the first Hello packet, and only the content of the Hello fragment packet corresponding to the first fragment ID is different, the sending, by the first network device, a Hello fragment packet corresponding to the first Hello packet to the second network device, including sending the Hello fragment packet that is corresponding to the first Hello packet and whose fragment ID is the first fragment ID to the second network device.

Figure 4:
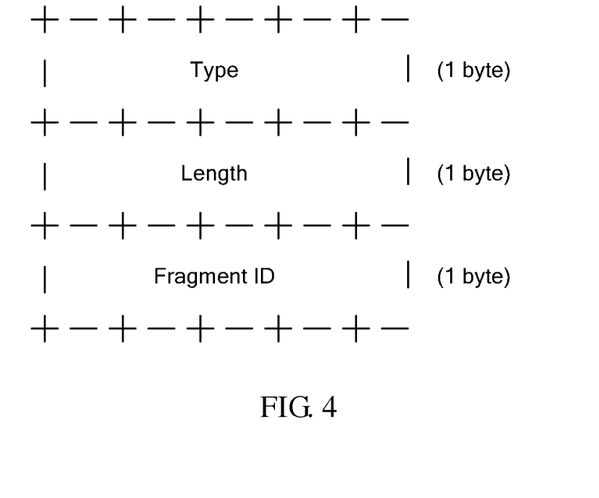
FIG. 4 is a schematic diagram of TLV of another type of request packet according to an embodiment of the present invention.

Optionally, when the content of the second Hello packet saved on the second network device is different from the content of the first Hello packet, and the content of a plurality of Hello fragment packets is different, the request packet may include fragment IDs of the plurality of Hello fragment packets. The format of request packet TLV is shown in FIG. 4, where:

Fragment ID (Fragment ID), used to identify a fragment ID included in the request packet.

Therefore, the first network device only needs to send the Hello fragment packet corresponding to the fragment ID included in the request packet to the second network device. This avoids a problem that network bandwidth is occupied by all the Hello fragment packets corresponding to the first Hello packet, which are sent by the first network device to the second network device, even when the content of the second Hello packet saved on the second network device is only partially different from the content of the first Hello packet.

It can be learned that, by using the technical solution provided in this embodiment of the present invention, a first network device, after fragmenting a first Hello packet, sends fragment brief information of the first Hello packet to a second network device; when determining that the fragment brief information of the first Hello packet is different from last received fragment brief information of a second Hello packet, the second network device sends a request message to the first network device to request to send a fragment packet of the first Hello packet to the second network device. This avoids the problem that the network bandwidth is occupied by the first Hello packet sent by the first network device to the second network device even when content of the second Hello packet saved on the second network device is the same as content of the first Hello packet; when the fragment brief information of the first Hello packet is the same as the fragment brief information of the second Hello packet, the first network device does not need to send the fragment packet of the first Hello packet to the second network device again, thereby reducing the network bandwidth occupied to send the Hello packet; when the content of the Hello fragment packet of the second Hello packet saved on the second network device is only partially different from the content of the Hello fragment packet of the first Hello packet, the first network device only needs to send the Hello fragment packet that has the different content to the second network device, thereby reducing the network bandwidth occupied to send the Hello packet.

Referring to FIG. 5, an embodiment of the present invention provides a method for receiving a Hello packet on a TRILL network. The method includes the following content.

502: A second network device receives fragment brief information of a first Hello packet sent by a first network device, where the fragment brief information of the first Hello packet includes fragment information corresponding to each Hello fragment packet of the first Hello packet, and the fragment information includes a fragment ID and a content identifier; the first network device fragments the first Hello packet into m Hello fragment packets in a preset packet fragmentation manner, where when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment corresponding to the second Hello packet (n is a fragment ID of the $n^{th}$ Hello fragment packet; n can be all positive integers ranging from 1 to m; and m is a positive integer); the second Hello packet is a Hello packet sent by the first network device at the last time before sending the first Hello packet; and the first network device has already fragmented the second Hello packet into p Hello fragment packets in the preset packet fragmentation manner (p is a positive integer).

The preset packet fragmentation manner includes a fragment ID allocation manner. According to the fragment ID allocation manner, different positive integers may be allocated according to a fragmentation sequence. For example, a fragment ID 1 is allocated to a first fragment packet, a fragment ID 2 is allocated to a second fragment packet, and so on. In this way, a different fragment ID is allocated to each fragment packet.

The content of the $n^{th}$ Hello fragment packet corresponding to the first Hello packet is different from the content of the $n^{th}$ Hello fragment packet corresponding to the second Hello packet. This specifically means that when packets have the same n value, their content is compared. For example, when n is 10, it means that content of the $10^{th}$ Hello fragment packet corresponding to the first Hello packet is different from content of the $10^{th}$ Hello fragment packet corresponding to the second Hello packet.

Optionally, the value of the content identifier may be a natural number. For example, when the second Hello packet is the first Hello packet sent by the first network device to another device on the network, a content identifier of each Hello fragment packet of the second Hello packet may be set to an initial value 0; when the content identifier of the $n^{th}$ Hello fragment packet corresponding to the first Hello packet is different from the content identifier of the $n^{th}$ Hello fragment packet corresponding to the second Hello packet, the content identifier of the $n^{th}$ Hello fragment packet corresponding to the first Hello packet is set to 1. Optionally, a content identifier of a Hello packet corresponding to a certain fragment ID increases, within a specific range, in a sequence of natural numbers, and the content identifier is reallocated from 0 when a value of the content identifier exceeds the specific range.

Optionally, when the content of the $n^{th}$ Hello fragment packet corresponding to the first Hello packet is the same as the content of the $n^{th}$ Hello fragment packet corresponding to the second Hello packet, the content identifier of the $n^{th}$ Hello fragment packet corresponding to the first Hello packet is set to be the same as the content identifier of the $n^{th}$ Hello fragment packet corresponding to the second Hello packet.

When the $n^{th}$ Hello fragment packet exists in the m Hello fragment packets but the $n^{th}$ Hello fragment packet does not exist in the p Hello fragment packets, the content identifier of the $n^{th}$ Hello fragment packet of the m Hello fragment packets is set to an initial value.

The fragment brief information of the first Hello packet may be encapsulated in a fragment brief information TLV manner, where a fragment brief information TLV may be carried in a Hello packet on the TRILL network. A format of the fragment brief information TLV is shown in FIG. 2. Details are not described herein again.

504: Send a request message to the first network device when the second device determines that the fragment brief information of the first Hello packet is different from saved fragment brief information of the second Hello packet, where the request message is used to request to obtain a Hello fragment packet corresponding to the first Hello packet, and the fragment brief information of the second Hello packet includes the fragment information of each Hello fragment packet of the p Hello fragment packets.

Optionally, that the second device determines that the fragment brief information of the first Hello packet is different from saved fragment brief information of the second Hello packet, includes confirming that the fragment brief information of the first Hello packet is different from the fragment brief information of the second Hello packet when it is determined that a data length of the fragment brief information of the first Hello packet is different from a data length of the fragment brief information of the second Hello packet; or confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, where a fragment ID of the first fragment information is the same as a fragment ID of the second fragment information, but a content identifier of the first fragment information is different from a content identifier of the second fragment information.

506: Receive the Hello fragment packet that is corresponding to the first Hello packet and is sent by the first network device.

Optionally, when the first network device does not receive a request message, which indicates that the content of the second Hello packet saved on the second network device is the same as the content of the first Hello packet, the second network device does not need to request to obtain, from the first network device, the Hello fragment packet of the first Hello packet. This avoids a problem that network bandwidth is occupied by the first Hello packet sent by the first network device to the second network device even when the content of the second Hello packet saved on the second network device is the same as the content of the first Hello packet.

Optionally, the second network device only needs to determine that the fragment brief information of the first Hello packet is different from the fragment brief information of the second Hello packet, but does not need to determine which fragment information is different. The second network device sends the request message to the first network device. When the first network device receives the request message, it indicates that the content of the second Hello packet saved on the second network device is different from the content of the first Hello packet. The receiving the Hello fragment packet that is corresponding to the first Hello packet and is sent by the first network device, includes receiving each Hello fragment packet that is corresponding to the first Hello packet and is sent by the first network device.

Optionally, a format of the request packet may be encapsulated in a TLV manner and may be carried in the Hello packet on the TRILL network. The format of the request packet is shown in FIG. 3. Details are not described herein again.

Optionally, the request packet includes a first fragment ID, and the first fragment ID meets the following conditions: a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet.

Accordingly, the receiving the Hello fragment packet that is corresponding to the first Hello packet and is sent by the first network device, includes receiving the Hello fragment packet that is corresponding to the first Hello packet and whose fragment ID is the first fragment ID.

Optionally, when the content of the second Hello packet saved on the second network device is different from the content of the first Hello packet, and the content of a plurality of Hello fragment packets is different, the request packet may include fragment IDs of the plurality of Hello fragment packets. The format of request packet TLV is shown in FIG. 4. Details are not described herein again.

Therefore, the first network device only needs to send the Hello fragment packet corresponding to the fragment ID included in the request packet to the second network device. This avoids a problem that network bandwidth is occupied by all the Hello fragment packets corresponding to the first Hello packet, which are sent by the first network device to the second network device, even when the content of the second Hello packet saved on the second network device is only partially different from the content of the first Hello packet.

It can be learned that, by using the technical solution provided in this embodiment of the present invention, a second network device sends a request message to a first network device to request to send a fragment packet of a first Hello packet to the second network device after receiving fragment brief information of the first Hello packet and determining that the fragment packet of the first Hello packet is different from a fragment packet of a second Hello packet. This avoids the problem that the network bandwidth is occupied by the first Hello packet sent by the first network device to the second network device even when content of the second Hello packet saved on the second network device is the same as content of the first Hello packet; when the fragment packet of the first Hello packet is the same as the fragment packet of the first Hello packet, the first network device does not need to send the fragment packet of the first Hello packet to the second network device again, thereby reducing the network bandwidth occupied to send the Hello packet; when the content of the Hello fragment packet of the second Hello packet saved on the second network device is only partially different from the content of the Hello fragment packet of the first Hello packet, the first network device only needs to send the Hello fragment packets that has the different content to the second network device, thereby reducing the network bandwidth occupied to send the Hello packet.

Figure 6:
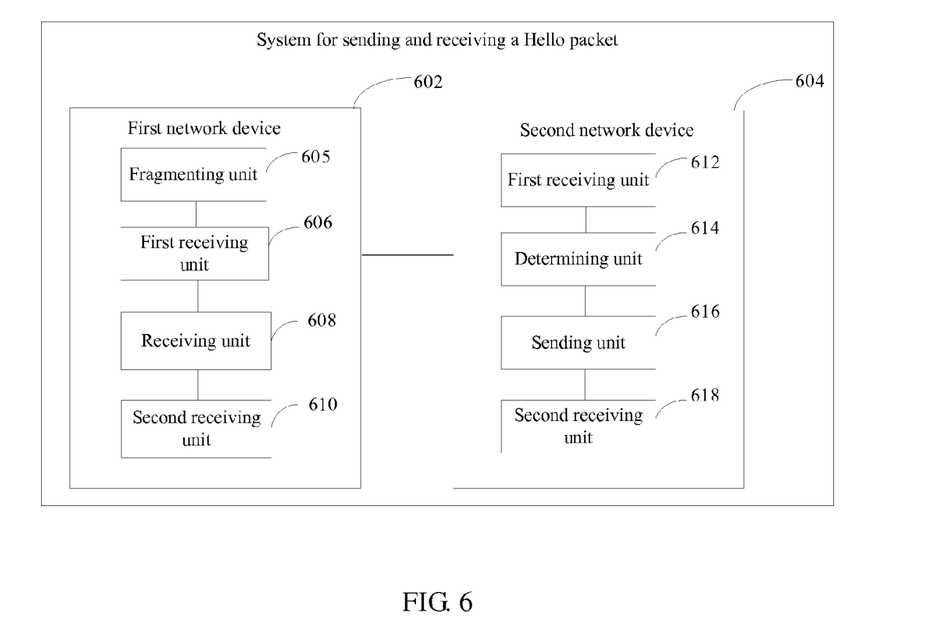
FIG. 6 is a schematic structural diagram of a system for sending and receiving a Hello packet according to an embodiment of the present invention.

Referring to FIG. 6, an embodiment of the present invention provides a system for sending and receiving a packet on a TRILL network. The system includes a first network device 602 and a second network device 604, where the first network device 602 includes a number of units.

A fragmenting unit 605 is configured to fragment a first Hello packet into m Hello fragment packets in a preset packet fragmentation manner. Each Hello fragment packet has a fragment ID and a content identifier, where when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment packet corresponding to the second Hello packet (n is a fragment ID of the $n^{th}$ Hello fragment packet; n can be all positive integers ranging from 1 to m; and m is a positive integer); the second Hello packet is the Hello packet sent by the first network device 602 at the last time before sending the first Hello packet, and the fragmenting unit 605 has already fragmented the second Hello packet into p Hello fragment packets in the preset packet fragmentation manner (p is a positive integer).

A first sending unit 606 is configured to send fragment brief information of the first Hello packet to the second network device 604, where the fragment brief information of the first Hello packet includes fragment information of each Hello fragment packet of the m Hello fragment packets, and the fragment information includes the fragment ID and the content identifier.

A receiving unit 608 is configured to receive a request packet sent by the second network device 604. A second sending unit 610 is configured to send a Hello fragment packet corresponding to the first Hello packet to the second network device 604 if the receiving unit 608 receives the request packet.

The second network device 604 includes: a first receiving unit 612, configured to receive the fragment brief information of the first Hello packet sent by the first sending unit 606; a determining unit 614, configured to determine whether the fragment brief information of the first Hello packet received by the first receiving unit 612 is the same as saved fragment brief information of the second Hello packet; a sending unit 616, configured to send a request message to the first network device 602 when the determining unit 614 determines that the fragment brief information of the first Hello packet received by the first receiving unit 612 is different from the saved fragment brief information of the second Hello packet, where the request message is used to request to obtain a Hello fragment packet corresponding to the first Hello packet, and the fragment brief information of the second Hello packet includes the fragment information of each Hello fragment packet of the p Hello fragment packets; and a second receiving unit 618, configured to receive the Hello fragment packet that is corresponding to the first Hello packet and is sent by the second sending unit 610.

Optionally, the fragmenting unit 605 is further configured to: set the content identifier of the $n^{th}$ Hello fragment packet corresponding to the first Hello packet to be the same as the content identifier of the $n^{th}$ Hello fragment packet corresponding to the second Hello packet when the content of the $n^{th}$ Hello fragment packet corresponding to the first Hello packet is the same as the content of the $n^{th}$ Hello fragment packet corresponding to the second packet; and set the content identifier of the $n^{th}$ Hello fragment packet of the m Hello fragment packets to an initial value when the $n^{th}$ Hello fragment packet exists in the m Hello fragment packets but the $n^{th}$ Hello fragment packet does not exist in the p Hello fragment packets.

The fragment brief information of the first Hello packet may be encapsulated in a fragment brief information TLV manner, where a fragment brief information TLV may be carried in a Hello packet on the TRILL network. A format of the fragment brief information TLV is shown in FIG. 2. Details are not described herein again.

Optionally, that the second network device 604 determines that the fragment brief information of the first Hello packet is different from the saved fragment brief information of the second Hello packet, includes confirming that the fragment brief information of the first Hello packet is different from the fragment brief information of the second Hello packet when it is determined that a data length of the fragment brief information of the first Hello packet is different from a data length of the fragment brief information of the second Hello packet; or confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, where a fragment ID of the first fragment information is the same as a fragment ID of the second fragment information, but a content identifier of the first fragment information is different from a content identifier of the second fragment information.

Optionally, the second network device 604 only needs to determine that the fragment brief information of the first Hello packet is different from the fragment brief information of the second Hello packet, but does not need to specifically determine which fragment information is different; then the sending unit 616 sends the request message to the first network device 602; when the receiving unit 608 receives the request message, it indicates that the content of the second Hello packet saved on the second network device 604 is different from the content of the first Hello packet. The sending, by the second sending unit 610, a Hello fragment packet corresponding to the first Hello packet to the second network device 604, includes sending each Hello fragment packet corresponding to the first Hello packet to the second network device 604.

Accordingly, the receiving, by the second receiving unit 618, the Hello fragment packet that is corresponding to the first Hello packet and is sent by the second sending unit 610, includes receiving each Hello fragment packet that is corresponding to the first Hello packet and is sent by the second sending unit 610.

Optionally, a format of the request packet may be encapsulated in a TLV manner and may be carried in the Hello packet on the TRILL network. The format of the request packet is shown in FIG. 3. Details are not described herein again.

Optionally, the request packet received by the receiving unit 608 includes a first fragment ID, and the first fragment ID meets the following conditions: a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, the second sending unit 610 sends the Hello fragment packet that is corresponding to the first Hello packet and whose fragment ID is the first fragment ID to the second network device 604. Accordingly, the receiving unit 608 receives the Hello fragment packet that is corresponding to the first Hello packet and is sent by the second sending unit 610 and whose fragment ID is the first fragment ID.

Optionally, the fragmenting unit 605, the first sending unit 606, the receiving unit 608, and the second sending unit 610 of the first network device 602 may be integrated into one or more units; the first receiving unit 612, the determining unit 614, the sending unit 616, and the second receiving unit 618 of the second network device 604 may be integrated into one or more standalone units.

Optionally, the first network device 602 and the second network device 604 may be a switch or a router.

It can be learned that, by using the technical solution provided in this embodiment of the present invention, a first network device 602, after fragmenting a first Hello packet, sends fragment brief information of the first Hello packet to a second network device 604; when determining that the fragment brief information of the first Hello packet is different from last received fragment brief information of a second Hello packet, the second network device 604 sends a request message to the first network device 602 to request to send a fragment packet of the first Hello packet to the second network device 604. This avoids the problem that the network bandwidth is occupied by the first Hello packet sent by the first network device 602 to the second network device 604 even when content of the second Hello packet saved on the second network device 604 is the same as content of the first Hello packet; when the fragment brief information of the first Hello packet is the same as the fragment brief information of the first Hello packet, the first network device 602 does not need to send the fragment packet of the first Hello packet to the second network device 604, thereby reducing the network bandwidth occupied to send the Hello packet; when the content of the Hello fragment packet of the second Hello packet saved on the second network device 604 is only partially different from the content of the Hello fragment packet of the first Hello packet, the first network device 602 only needs to send the Hello fragment packet that has the different content to the second network device 604, thereby reducing the network bandwidth occupied to send the Hello packet.

Figure 7:
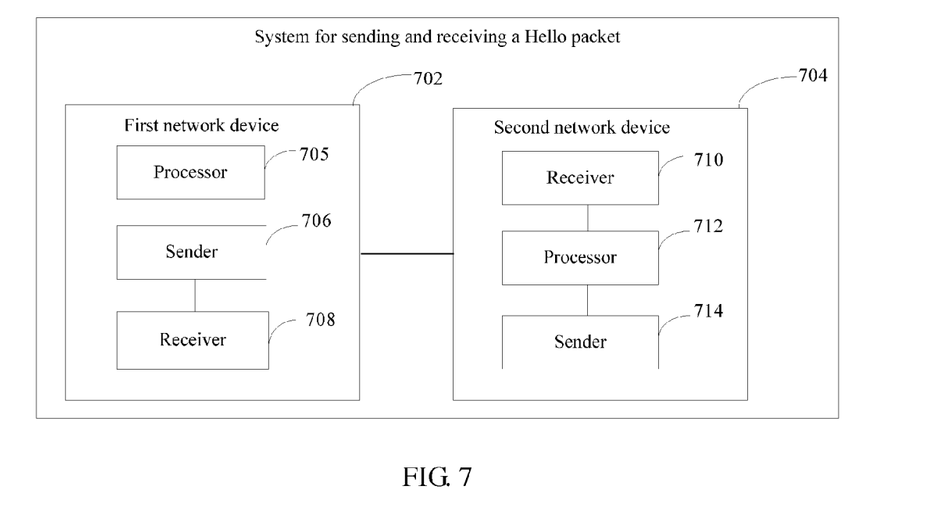
FIG. 7 is a schematic structural diagram of another type of system for sending and receiving a Hello packet according to an embodiment of the present invention.

Referring to FIG. 7, an embodiment of the present invention provides a system for sending and receiving a packet on a TRILL network. The system includes a first network device 702 and a second network device 704. The first network device 702 includes a number of elements.

A processor 705 is configured to fragment a first Hello packet into m Hello fragment packets in a preset packet fragmentation manner. Each Hello fragment packet has a fragment ID and a content identifier, where when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment packet corresponding to the second Hello packet (n is a fragment ID of the $n^{th}$ Hello fragment packet; n can be all positive integers ranging from 1 to m; and m is a positive integer). The second Hello packet is the Hello packet sent by the first network device 702 at the last time before sending the first Hello packet, and the processor 705 has fragmented the second Hello packet into p Hello fragment packets in the preset packet fragmentation manner (p is a positive integer).

A sender 706 is configured to send fragment brief information of the first Hello packet to the second network device 704. The fragment brief information of the first Hello packet includes fragment information of each Hello fragment packet of the m Hello fragment packets, and the fragment information includes the fragment ID and the content identifier. A receiver 708 is configured to receive a request packet sent by the second network device 704.

The sender 706 is further configured to send a Hello fragment packet corresponding to the first Hello packet to the second network device 704 if the receiver 708 receives the request packet.

The second network device 704 includes a receiver 710, configured to receive the fragment brief information of the first Hello packet sent by the sender 706; a processor 712, configured to determine whether the fragment brief information of the first Hello packet received by the receiver 710 is the same as saved fragment brief information of the second Hello packet; and a sender 714, configured to send a request message to the first network device 702 when the processor 712 determines that the fragment brief information of the first Hello packet received by the receiver 710 is different from the saved fragment brief information of the second Hello packet, where the request message is used to request to obtain a Hello fragment packet corresponding to the first Hello packet, and the fragment brief information of the second Hello packet includes the fragment information of each Hello fragment packet of the p Hello fragment packets.

The receiver 710 is configured to receive the Hello fragment packet that is corresponding to the first Hello packet and is sent by the sender 706.

Optionally, the processor 705 is further configured to: set the content identifier of the $n^{th}$ Hello fragment packet corresponding to the first Hello packet to be the same as the content identifier of the $n^{th}$ Hello fragment packet corresponding to the second Hello packet when the content of the $n^{th}$ Hello fragment packet corresponding to the first Hello packet is the same as the content of the $n^{th}$ Hello fragment packet corresponding to the second packet; and set the content identifier of the $n^{th}$ Hello fragment packet of the m Hello fragment packets to an initial value when the $n^{th}$ Hello fragment packet exists in the m Hello fragment packets but the $n^{th}$ Hello fragment packet does not exist in the p Hello fragment packets.

The fragment brief information of the first Hello packet may be encapsulated in a fragment brief information TLV manner, where a fragment brief information TLV may be carried in a Hello packet on the TRILL network. A format of the fragment brief information TLV is shown in FIG. 2. Details are not described herein again.

Optionally, that the processor 712 of the second network device 704 determines whether the fragment brief information of the first Hello packet is the same as the saved fragment brief information of the second Hello packet, includes confirming that the fragment brief information of the first Hello packet is different from the fragment brief information of the second Hello packet when it is determined that a data length of the fragment brief information of the first Hello packet is different from a data length of the fragment brief information of the second Hello packet; or confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, where a fragment ID of the first fragment information is the same as a fragment ID of the second fragment information, but a content identifier of the first fragment information is different from a content identifier of the second fragment information.

Optionally, the processor 712 of the second network device 704 only needs to determine that the fragment brief information of the first Hello packet is different from the fragment brief information of the second Hello packet, but does not need to specifically determine which fragment information is different; then the sender 714 sends the request message to the first network device 702; when the receiver 708 receives the request message, it indicates that the content of the second Hello packet saved on the second network device 704 is different from the content of the first Hello packet. The sending, by the sender 706, a Hello fragment packet corresponding to the first Hello packet to the second network device 704, includes sending each Hello fragment packet corresponding to the first Hello packet to the second network device 704.

Accordingly, the receiving, by the receiver 710, the Hello fragment packet that is corresponding to the first Hello packet and is sent by the sender 706, includes receiving each Hello fragment packet that is corresponding to the first Hello packet and is sent by the sender 706.

Optionally, a format of the request packet may be encapsulated in a TLV manner and may be carried in the Hello packet on the TRILL network. The format of the request packet is shown in FIG. 3. Details are not described herein again.

Optionally, the request packet received by the receiver 708 includes a first fragment ID, and the first fragment ID meets the following conditions: a content identifier of third fragment information corresponding to the first fragment ID is different from a content identifier of fourth fragment information corresponding to the first fragment ID, where the third fragment information is fragment information whose fragment ID is the first fragment ID in the fragment brief information of the first Hello packet, and the fourth fragment information is fragment information whose fragment ID is the first fragment ID in the fragment brief information of the second Hello packet. Accordingly, the sender 706 sends the Hello fragment packet that is corresponding to the first Hello packet and whose fragment ID is the first fragment ID to the second network device 704. Accordingly, the receiver 710 receives the Hello fragment packet that is corresponding to the first Hello packet and is sent by the sender 706 and whose fragment ID is the first fragment ID.

It can be learned that, by using the technical solution provided in this embodiment of the present invention, a first network device 702, after fragmenting a first Hello packet, sends fragment brief information of the first Hello packet to a second network device 704; when determining that the fragment brief information of the first Hello packet is different from last received fragment brief information of a second Hello packet, the second network device 704 sends a request message to the first network device 702 to request to send a fragment packet of the first Hello packet to the second network device 704. This avoids the problem that the network bandwidth is occupied by the first Hello packet sent by the first network device 702 to the second network device 704 even when content of the second Hello packet saved on the second network device 704 is the same as content of the first Hello packet; when the fragment brief information of the first Hello packet is the same as the fragment brief information of the first Hello packet, the first network device 702 does not need to send the fragment packet of the first Hello packet to the second network device 704, thereby reducing the network bandwidth occupied to send the Hello packet; when the content of the Hello fragment packet of the second Hello packet saved on the second network device 704 is only partially different from the content of the Hello fragment packet of the first Hello packet, the first network device 702 only needs to send the Hello fragment packet that has the different content to the second network device 704, thereby reducing the network bandwidth occupied to send the Hello packet.

Optionally, the processor 705, the sender 706, and the receiver 708 of the first network device 702 may be integrated into one or more independent circuits or hardware, for example, an Application Specific Integrated Circuit (Application Specific Integrated Circuit, ASIC for short); the receiver 710, the processor 712, and the sender 714 of the second network device 704 may be integrated into one or more independent circuits or hardware, for example, the ASIC.

Optionally, the first network device 702 and the second network device 704 may be a switch or a router.

In the embodiments of the present invention, the word "first" in a first Hello packet, a first network device, first fragment information, a first fragment ID, a first sending unit, and a first receiving unit is only used as a name identifier, and does not mean being the first in a sequence; the word "second" in a second Hello packet, a second network device, second fragment information, a second receiving unit, and a second sending unit is also used as the name identifier, and does not mean being the second in the sequence; the word "third" in third fragment information is only used as the name identifier, and does not mean being the third in the sequence; and the word "fourth" in fourth fragment information is only used as the name identifier, and does not mean being the fourth in the sequence.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for exemplarily describing the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

What is claimed is:

1. A method for sending a Hello packet on a transparent interconnection of lots of links (TRILL) network, the method comprising:

fragmenting, by a first network device, a first Hello packet into m Hello fragment packets in a preset packet fragmentation manner, wherein each Hello fragment packet has a fragment ID and a content identifier, wherein, when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment packet corresponding to the second Hello packet, wherein n is a fragment ID of the $n^{th}$ Hello fragment packet, n can be all positive integers ranging from 1 to m, and m is a positive integer, wherein the second Hello packet is a Hello packet sent by the first network device at the last time before sending the first Hello packet, and the first network device has already fragmented the second Hello packet into p Hello fragment packets in the preset packet fragmentation manner, wherein p is a positive integer;

sending, by the first network device, fragment brief information of the first Hello packet to a second network device, wherein the fragment brief information of the first Hello packet comprises fragment information of each Hello fragment packet of the m Hello fragment packets, and the fragment brief information comprises the fragment ID and the content identifier; and sending a Hello fragment packet corresponding to the first Hello packet to the second network device when the first network device receives a request packet sent by the second network device, wherein the request packet is sent after the second network device receives the fragment brief information of the first Hello packet and determines that the fragment brief information of the first Hello packet is different from fragment brief information of the second Hello packet saved on the second network device, and the fragment brief information of the second Hello packet comprises fragment information of each Hello fragment packet of the p Hello fragment packets.

2. The method according to claim 1, further comprising: setting the content identifier of the $n^{th}$ Hello fragment packet corresponding to the first Hello packet to be the same as the content identifier of the $n^{th}$ Hello fragment packet corresponding to the second Hello packet when the content of the $n^{th}$ Hello fragment packet corresponding to the first Hello packet is the same as the content of the $n^{th}$ Hello fragment packet corresponding to the second Hello packet; and setting the content identifier of the $n^{th}$ Hello fragment packet of the m Hello fragment packets to an initial value when the $n^{th}$ Hello fragment packet exists in the m Hello fragment packets but the $n^{th}$ Hello fragment packet does not exist in the p Hello fragment packets.

3. The method according to claim 1, wherein determining that the fragment brief information of the first Hello packet is different from fragment brief information of the second Hello packet saved on the second network device comprises confirming that the fragment brief information of the first Hello packet is different from the fragment brief information of the second Hello packet when it is determined that a data length of the fragment brief information of the first Hello packet is different from a data length of the fragment brief information of the second Hello packet.

4. The method according to claim 1, wherein determining that the fragment brief information of the first Hello packet is different from fragment brief information of the second Hello packet saved on the second network device comprises confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, wherein a fragment ID of the first fragment information is the same as a fragment ID of the second fragment information, but a content identifier of the first fragment information is different from a content identifier of the second fragment information.

5. The method according to claim 1, wherein sending the Hello fragment packet corresponding to the first Hello packet to the second network device, comprises sending each Hello fragment packet corresponding to the first Hello packet to the second network device.

6. The method according to claim 1, wherein the request packet comprises a first fragment ID, and the first fragment ID meets the following conditions:

a content identifier of third fragment information corresponding to the first fragment ID is different from a content identifier of fourth fragment information corresponding to the first fragment ID, wherein the third fragment information is fragment information whose fragment ID is the first fragment ID in the fragment brief information of the first Hello packet, and the fourth fragment information is fragment information whose fragment ID is the first fragment ID in the fragment brief information of the second Hello packet; and wherein sending the Hello fragment packet corresponding to the first Hello packet to the second network device comprises sending the Hello fragment packet that is corresponding to the first Hello packet and whose fragment ID is the first fragment ID to the second network device.

7. A method for receiving a Hello packet on a transparent interconnection of lots of links (TRILL) network, the method comprising:

receiving, by a second network device, fragment brief information of a first Hello packet sent by a first network device, wherein the fragment brief information of the first Hello packet comprises fragment information corresponding to each Hello fragment packet of the first Hello packet, wherein the fragment information comprises a fragment ID and a content identifier, wherein the first network device has already fragmented the first Hello packet into m Hello fragment packets in a preset packet fragmentation manner, wherein when content of an $n^{th}$ Hello fragment packet corresponding to the first Hello packet is different from content of an $n^{th}$ Hello fragment packet corresponding to a second Hello packet, the first network device has already set a content identifier of the $n^{th}$ Hello fragment packet corresponding to the first Hello packet to be different from a content identifier of the $n^{th}$ Hello fragment packet corresponding to the second Hello packet, wherein n is a fragment ID of the $n^{th}$ Hello fragment packet, n can be all positive integers ranging from 1 to m, and m is a positive integer, wherein the second Hello packet is a Hello packet sent by the first network device at the last time before sending the first Hello packet, and the first network device has already fragmented the second Hello packet into p Hello fragment packets in the preset packet fragmentation manner, wherein p is a positive integer;

sending a request message to the first network device when the second network device determines that the fragment brief information of the first Hello packet is different from saved fragment brief information of the second Hello packet, wherein the request message is used to request to obtain a Hello fragment packet corresponding to the first Hello packet, and the fragment brief information of the second Hello packet comprises the fragment information of each Hello fragment packet of the p Hello fragment packets; and receiving the Hello fragment packet that corresponds to the first Hello packet and is sent by the first network device.

8. The method according to claim 7, wherein the second network device determines that the fragment brief information of the first Hello packet is different from saved fragment brief information of the second Hello packet, by confirming that the fragment brief information of the first Hello packet is different from the fragment brief information of the second Hello packet when it is determined that a data length of the fragment brief information of the first Hello packet is different from a data length of the fragment brief information of the second Hello packet.

9. The method according to claim 7, wherein the second network device determines that the fragment brief information of the first Hello packet is different from saved fragment brief information of the second Hello packet, by confirming that the fragment brief information of the first Hello packet is different from the fragment brief information of the second Hello packet when it is determined that a data length of the fragment brief information of the first Hello packet is the same as a data length of the fragment brief information of the second Hello packet, but first fragment information exists in the fragment brief information of the first Hello packet, and second fragment information exists in the fragment brief information of the second Hello packet, wherein a fragment ID of the first fragment information is the same as a fragment ID of the second fragment information, but a content identifier of the first fragment information is different from a content identifier of the second fragment information.

10. The method according to claim 7, wherein receiving the Hello fragment packet that corresponds to the first Hello packet comprises receiving each Hello fragment packet that is corresponding to the first Hello packet and is sent by the first network device.

11. The method according to claim 7, wherein the request packet comprises a first fragment ID, and the first fragment ID meets the following conditions:

a content identifier of third fragment information corresponding to the first fragment ID is different from a content identifier of fourth fragment information corresponding to the first fragment ID, wherein the third fragment information is fragment information whose fragment ID is the first fragment ID in the fragment brief information of the first Hello packet, and the fourth fragment information is fragment information whose fragment ID is the first fragment ID in the fragment brief information of the second Hello packet; and wherein receiving the Hello fragment packet that corresponds to the first Hello packet comprises receiving the Hello fragment packet that is corresponding to the first Hello packet and whose fragment ID is the first fragment ID.

12. A network device for sending a Hello packet on a transparent interconnection of lots of links (TRILL) network, wherein the network device comprises:

a processor; and a non-transitory computer-readable storage medium storing a program to be executed by the processor, the program including instructions for:

fragmenting a first Hello packet into m Hello fragment packets in a preset packet fragmentation manner, wherein each Hello fragment packet has a fragment ID and a content identifier, wherein when content of an $n^{th}$ Hello fragment packet corresponding to the first Hello packet is different from content of an $n^{th}$ Hello fragment packet corresponding to a second Hello packet, a content identifier of the $n^{th}$ Hello fragment packet corresponding to the first Hello packet is set to be different from a content identifier of the $n^{th}$ Hello fragment packet corresponding to the second Hello packet, wherein n is a fragment ID of the $n^{th}$ Hello fragment packet, n can be all positive integers ranging from 1 to m, and m is a positive integer; the second Hello packet is a Hello packet sent by the network device at the last time before sending the first Hello packet, wherein the network device has already fragmented the second Hello packet into p Hello fragment packets in the preset packet fragmentation manner, wherein p is a positive integer;

sending fragment brief information of the first Hello packet to a second network device, wherein the fragment brief information of the first Hello packet comprises fragment information of each Hello fragment packet of the m Hello fragment packets, and the fragment information comprises the fragment ID and the content identifier;

receiving a request packet sent by the second network device, wherein the request packet is sent after the second network device receives the fragment brief information of the first Hello packet and determines that the fragment brief information of the first Hello packet is different from fragment brief information of the second Hello packet saved on the second network device, and the fragment brief information of the second Hello packet comprises fragment information of each Hello fragment packet of the p Hello fragment packets; and sending a Hello fragment packet corresponding to the first Hello packet to the second network device when the network device receives the request packet.

13. The network device according to claim 12, wherein the program includes further instructions for:
setting the content identifier of the $n^{th}$ Hello fragment packet corresponding to the first Hello packet to be the same as the content identifier of the $n^{th}$ Hello fragment packet corresponding to the second Hello packet when the content of the $n^{th}$ Hello fragment packet corresponding to the first Hello packet is the same as the content of the $n^{th}$ Hello fragment packet corresponding to the second packet; and
setting the content identifier of the $n^{th}$ Hello fragment packet of the m Hello fragment packets to an initial value when the $n^{th}$ Hello fragment packet exists in the m Hello fragment packets but the $n^{th}$ Hello fragment packet does not exist in the p Hello fragment packets.

14. The network device according to claim 12, wherein sending the Hello fragment packet corresponding to the first Hello packet to the second network device comprises sending each Hello fragment packet corresponding to the first Hello packet to the second network device.

15. The network device according to claim 12, wherein the request packet comprises a first fragment ID, and the first fragment ID meets the following conditions:
a content identifier of third fragment information corresponding to the first fragment ID is different from a content identifier of fourth fragment information corresponding to the first fragment ID, wherein the third fragment information is fragment information whose fragment ID is the first fragment ID in the fragment brief information of the first Hello packet, and the fourth fragment information is fragment information whose fragment ID is the first fragment ID in the fragment brief information of the second Hello packet; and
wherein the Hello fragment packet that corresponds to the first Hello packet and whose fragment ID is the first fragment ID is sent to the second network device.

16. A network device for receiving a Hello packet on a transparent interconnection of lots of links (TRILL) network, wherein the network device comprises:
a processor; and
a non-transitory computer-readable storage medium storing a program to be executed by the processor, the program including instructions for:
receiving fragment brief information of a first Hello packet sent by a first network device, wherein the fragment brief information of the first Hello packet comprises fragment information corresponding to each Hello fragment packet of the first Hello packet, wherein the fragment information comprises a fragment ID and a content identifier, wherein the first network device has already fragmented the first Hello packet into m Hello fragment packets in a preset packet fragmentation manner, wherein when content of an $n^{th}$ Hello fragment packet corresponding to the first Hello packet is different from content of an $n^{th}$ Hello fragment packet corresponding to a second Hello packet, the first network device has already set a content identifier of the $n^{th}$ Hello fragment packet corresponding to the first Hello packet to be different from a content identifier of the $n^{th}$ Hello fragment packet corresponding to the second Hello packet; wherein n is a fragment ID of the $n^{th}$ Hello fragment packet, n can be all positive integers ranging from 1 to m, and m is a positive integer, wherein the second Hello packet is a Hello packet sent by the first network device at the last time before sending the first Hello packet, and the first network device has already fragmented the second Hello packet into p Hello fragment packets in the preset packet fragmentation manner, wherein p is a positive integer;
determining whether the fragment brief information of the first Hello packet received by the first receiving unit is the same as saved fragment brief information of the second Hello packet;
sending a request message to the first network device when it is determined that the fragment brief information of the first Hello packet received by the network device is different from the saved fragment brief information of the second Hello packet, wherein the request message is used to request to obtain a Hello fragment packet corresponding to the first Hello packet, and the fragment brief information of the second Hello packet comprises the fragment information of each Hello fragment packet of the p Hello fragment packets; and
receiving the Hello fragment packet that corresponds to the first Hello packet and is sent by the first network device.

17. The network device according to claim 16, wherein receiving the Hello fragment packet that is corresponding to the first Hello packet comprises receiving each Hello fragment packet that is corresponding to the first Hello packet and is sent by the first network device.

18. The network device according to claim 16, wherein the request packet comprises a first fragment ID, and the first fragment ID meets the following conditions:
a content identifier of third fragment information corresponding to the first fragment ID is different from a content identifier of fourth fragment information corresponding to the first fragment ID, wherein the third fragment information is fragment information whose fragment ID is the first fragment ID in the fragment brief information of the first Hello packet, and the fourth fragment information is fragment information whose fragment ID is the first fragment ID in the fragment brief information of the second Hello packet; and
wherein the Hello fragment packet that corresponds to the first Hello packet and whose fragment ID is the first fragment ID is received.

* * * * *